(12) United States Patent
Ouyang

(10) Patent No.: US 8,331,107 B2
(45) Date of Patent: Dec. 11, 2012

(54) KEY BUTTON MECHANISM AND PORTABLE ELECTRONIC DEVICE USING SAME

(75) Inventor: Zhi-Bin Ouyang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 284 days.

(21) Appl. No.: 12/837,573

(22) Filed: Jul. 16, 2010

(65) Prior Publication Data

US 2011/0182047 A1 Jul. 28, 2011

(30) Foreign Application Priority Data

Jan. 22, 2010 (CN) .......................... 2010 1 0300612

(51) Int. Cl.
*H05K 7/02* (2006.01)
*H05K 7/04* (2006.01)
*H01H 1/52* (2006.01)
*H01H 3/20* (2006.01)
*H01H 9/00* (2006.01)

(52) U.S. Cl. ...................................... 361/807; 200/321

(58) Field of Classification Search ..................... 455/90
See application file for complete search history.

(56) References Cited

U.S. PATENT DOCUMENTS

| 5,934,453 | A  | * | 8/1999  | Sugawara et al. | 200/339  |
| 6,148,183 | A  | * | 11/2000 | Higdon et al.   | 455/575.1 |
| 6,239,726 | B1 | * | 5/2001  | Saida           | 340/999  |
| 6,617,535 | B2 | * | 9/2003  | Lacroix         | 200/339  |
| 7,094,983 | B2 | * | 8/2006  | Tsunemoto       | 200/339  |
| 7,217,898 | B2 | * | 5/2007  | Chien et al.    | 200/339  |
| 7,554,050 | B1 | * | 6/2009  | Lv              | 200/339  |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

A key button mechanism and a portable electronic device using same are provided. The key button mechanism includes a key button and a capturing element detachably latching with the key button. The key button includes a key body and two spaced-apart latching hooks protruding from the same surface of the key body. The capturing element includes a main body having two assembling holes spacingly defined therethrough, each assembling hole corresponds to one of the two latching hooks of the key button, each latching hook of the key button passes through one of the two assembling holes of the capturing element and detachably latches to the capturing element.

13 Claims, 6 Drawing Sheets

KEY BUTTON MECHANISM AND PORTABLE ELECTRONIC DEVICE USING SAME

BACKGROUND

1. Technical Field

This disclosure relates to key button mechanisms, particularly to key button mechanisms used in a portable electronic device.

2. Description of Related Art

Many portable electronic devices such as mobile phones, have housings with interior compartments for receiving printed circuit boards (PCBs) therein. The mobile phone usually includes a key button mechanism attached to an outer sidewall of the housing for implementing additional functions. Users can directly operate the key button mechanism to conveniently control the mobile phone. However, typical key button mechanisms often occupy a large space of the housing, and can be difficult to actuate.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary key button mechanism and portable electronic device using same. Moreover, in the drawings like reference numerals designate corresponding parts throughout the several views. Wherever possible, the same reference numerals are used throughout the drawings to refer to the same or like elements of an embodiment.

DETAILED DESCRIPTION

The key button mechanism is assembled to one side portion of a portable electronic device such as a mobile telephone, for controlling or operating the portable electronic device conveniently as a function key. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers or keyboard-based handheld devices, remote control units, and portable media players (such as an MP3 or DVD player). Accordingly, any reference herein to the mobile telephone should also be considered to apply equally to other portable electronic devices.

Figure 1:
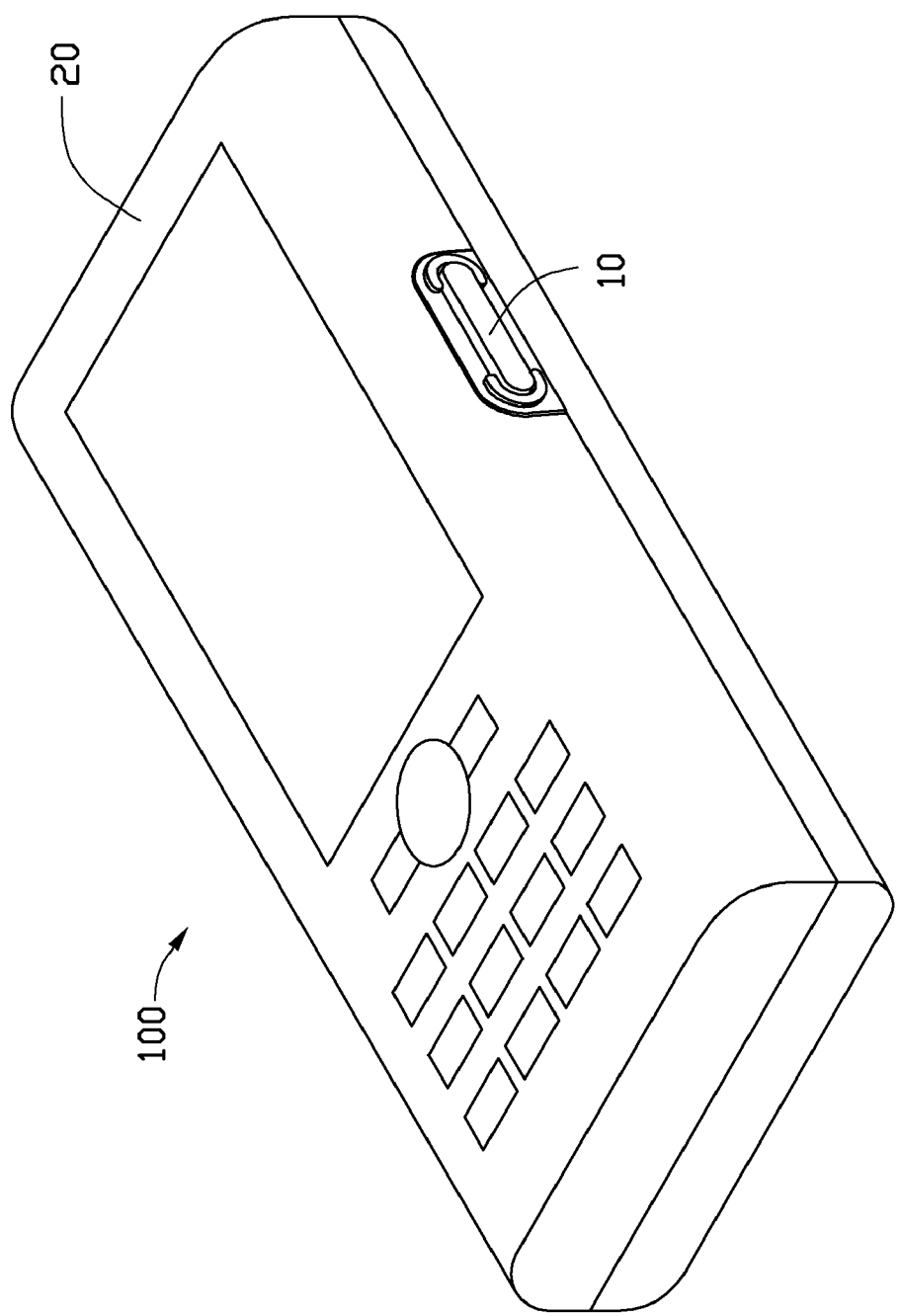
FIG. 1 shows a perspective view of a portable electronic device using an exemplary key button mechanism.
Figure 2:
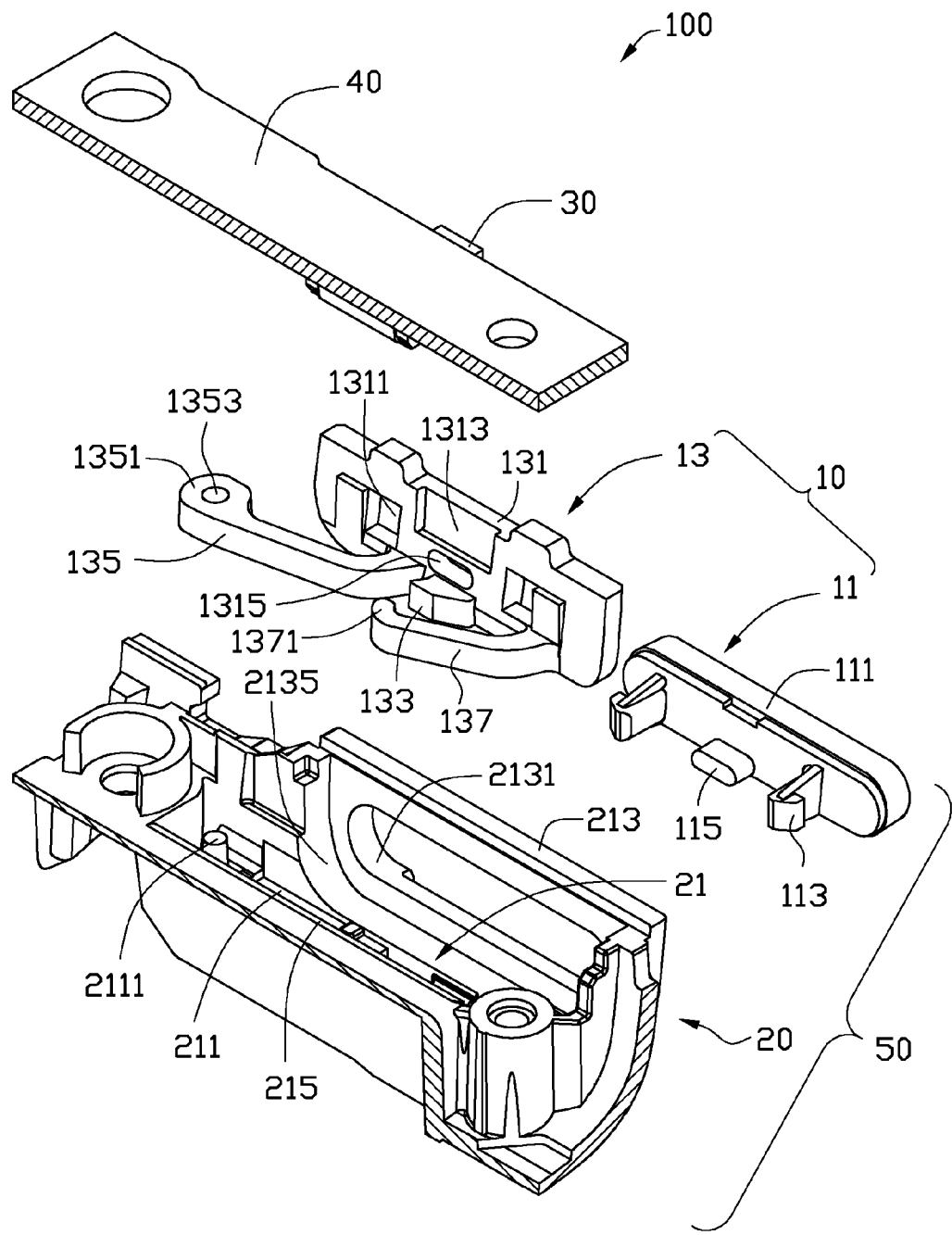
FIG. 2 shows an exploded partial perspective view of the portable electronic device shown in FIG. 1.
Figure 4:
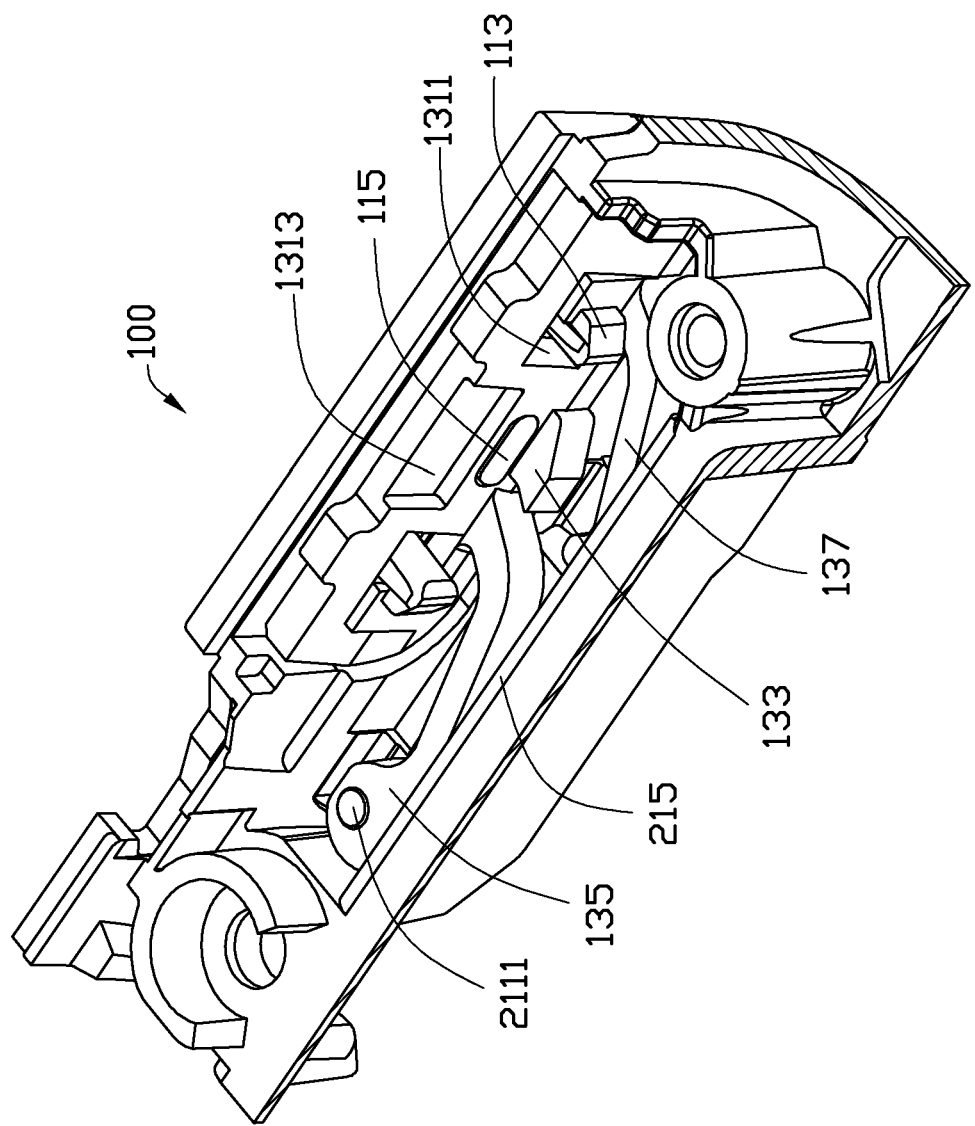
FIGS. 4 and 5 are two partial assembled perspective view of the portable electronic device shown in FIG. 2.
Figure 5:
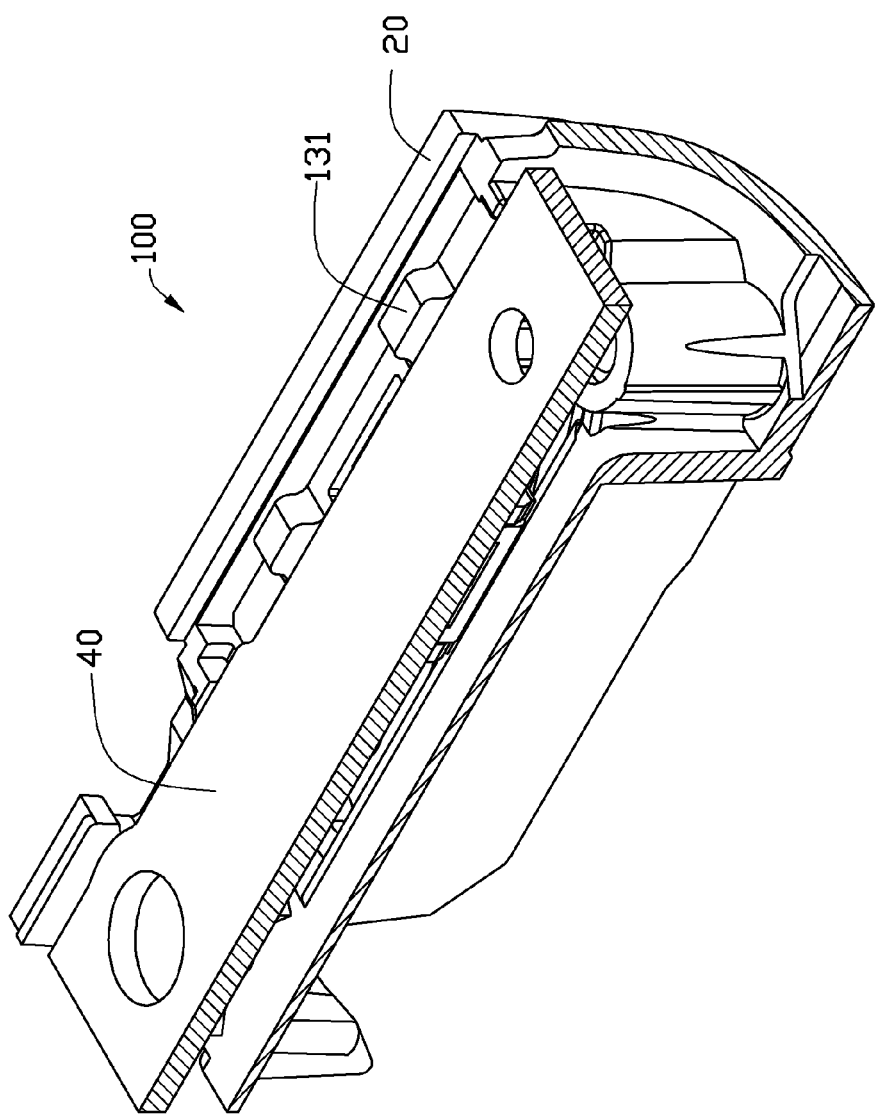

FIG. 2, FIG. 4 and FIG. 5 show an embodiment of a portable electronic device 100 incorporating a key button mechanism 50, a switch 30 and a circuit board 40. The key button mechanism 50 includes a key button assembly 10 and a housing 20. The key button assembly 10 and the circuit board 40 are assembled to the housing 20. The switch 30 is electrically mounted on the circuit board 40 and positioned between the circuit board 40 and the button assembly 10. The switch 30 is to be triggered by pressing the corresponding key button assembly 10, to generate an electric controlling signal transmitted to the circuit board 40 for controlling the portable electronic device 100.

The key button assembly 10 includes a key button 11 and a capturing element 13. The key button 11 includes a key body 111, two latching hooks 113 and a stopping post 115. The two latching hooks 113 are spaced-apart and protrude from the same surface of the key body 111 and adjacent to the distal ends of the key body 111. The stopping post 115 protrudes from the key body 111 and is located between the two latching hooks 113.

The capturing element 13 includes a main body 131, a block 133, a first elastic arm 135 and a second elastic arm 137. The main body 131 includes two spaced apart assembling holes 1311, each assembling hole 1311 adjacent to one of the ends of the main body 131, and corresponding to the two latching hooks 113 of the key button 11. The capturing element 13 can be attached or detached from the key button 11, where the two latching hooks 113 of the key button 11 pass through the corresponding two assembling holes 1311 of the capturing element 13. A resisting groove 1313 is recessed from one surface of the main body 131 and positioned between the two assembling holes 1311 corresponding to the switch 30. An accommodating hole 1315 is defined through the main body 131 adjacent to the resisting groove 1313 and corresponding to the stopping post 115 of the key button 11. In other exemplary embodiments, the capturing element 13 can also be a connecting element received in the housing 20 and located between the housing 20 and the key button 11. The connecting element is configured to locate the key button 11 in the housing 20 and elastically resists the housing 20 to provide a force enabling the key button 20 to rebound from the switch 30 after the key button 11 triggers the switch 30.

The block 133 protrudes from the main body 131, adjacent to the accommodating hole 1315. The first elastic arm 135 and the second elastic arm 137 are spaced-apart and protrude from the main body 131, each adjacent to one of the corresponding two assembling holes 1311. The block 133 is positioned between the first elastic arm 135 and the second elastic arm 137. The first elastic arm 135 has a distal fixing end 1351 and defines a fixing hole 1353 through the distal fixing end 1351. In this present exemplary embodiment, the second elastic arm 137 extends toward the first elastic arm 135 and includes a stopping portion 1371 formed at the distal end thereof. The stopping portion 1371 is located in front of the block 133 and configured to prevent the main body 131 being over pressed. Herein any reference to the term "over pressed" is defined as pressing the button too deeply. When the main body 131 of the capturing element 13 is over pressed in use toward the second elastic arm 137, the block 133 may resist against the stopping portion 1371.

The housing 20 defines an assembling groove 21 enclosed by a base wall 211, an outer assembling wall 213 and an inner resisting wall 215 opposite to the outer assembling wall 213. The base wall 211, the outer assembling wall 213 and the inner resisting wall 215 form the assembling groove 21 for accommodating the key mechanism 50 within the assembling groove 21. A fixing post 2111 perpendicularly protrudes from the base wall 211 corresponding to the fixing hole 1353 of the first elastic arm 135. The diameter of the fixing post 2111 is slightly smaller than the fixing hole 1353, so the first elastic arm 135 of the capturing element 13 can be detachably assembled to the fixing post 2111 and the fixing post 2111 can pass through the fixing hole 1353 of the first elastic arm 135 and elastically resists against the resisting wall 215 of the assembling groove 21.

Figure 3:
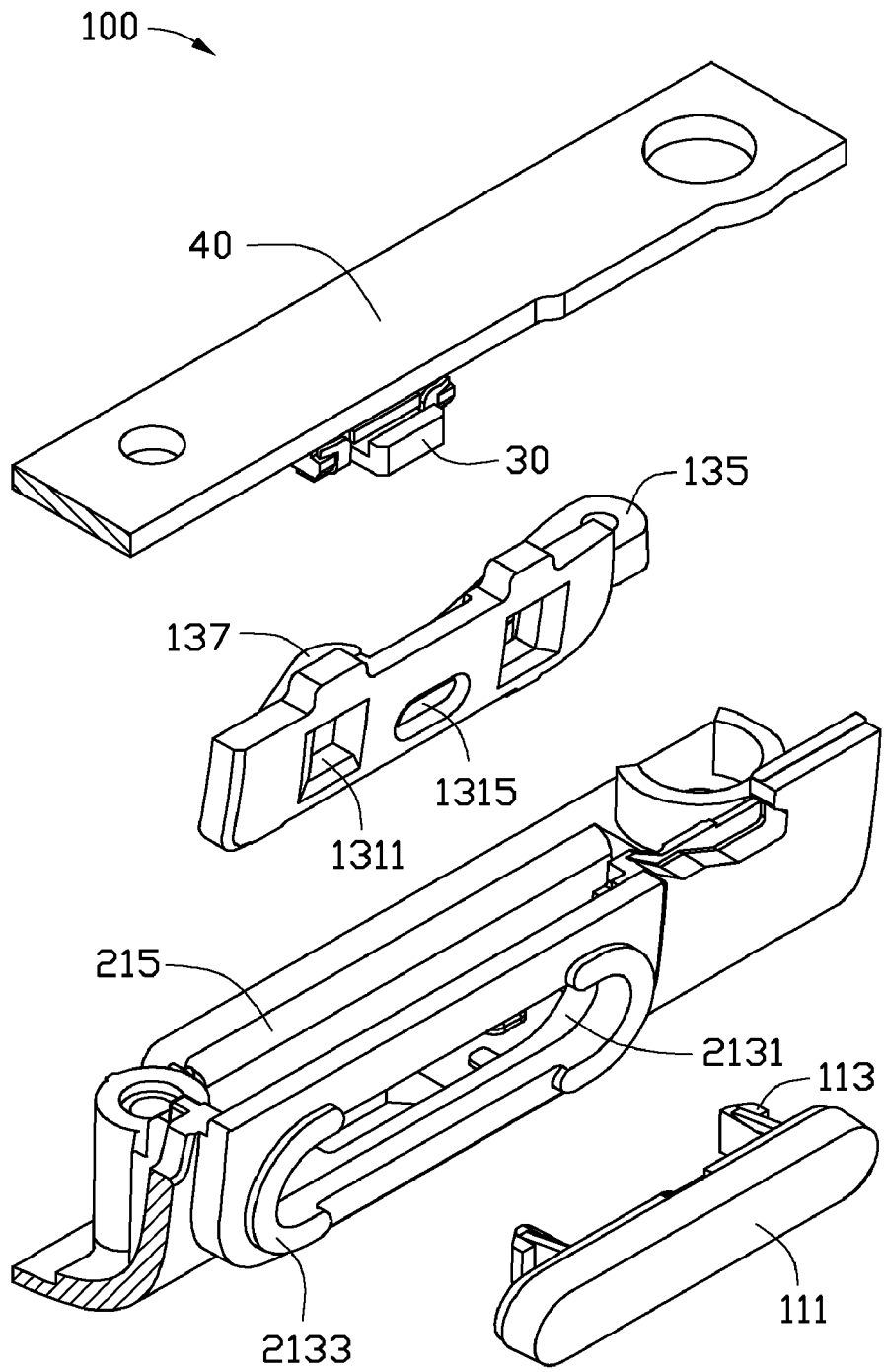
FIG. 3 is similar to FIG. 2, but viewed from another aspect.

A key accommodating groove 2131 is recessed from an outer surface of the outer assembling wall 213 and is configured to receive the key button 11 therein. The inner surface of the outer assembling wall 213 defines a retaining slot 2135 communicating with the key accommodating groove 2131. The shape of the retaining slot 2135 is slightly larger than the accommodating groove 2131. Referring also to FIG. 3, two locating protrusions 2133 protrude from the outer surface of the outer assembling wall 213 and are located adjacent to the two ends of the accommodating groove 2131, thereby forming an accommodating space with the accommodating groove 2131 for receiving the key button 11.

Referring to FIGS. 2, 4 and 5, in assembly, the capturing element 13 is assembled into the assembling groove 21 of the housing 20. The main body 131 is received within the corresponding retaining slot 2135, and the first elastic arm 135 and the second elastic arm 137 are received within the assembling groove 21. The distal fixing end 1351 is secured to the fixing post 2111. The fixing post 2111 passes through the fixing hole 1353 of the first elastic arm 135. After that, the key button 11 is assembled into the accommodating groove 2131 and is latched to the capturing element 13. The two latching hooks 113 and the stopping post 115 of the key button 11 respectively pass through the corresponding two assembling holes 1311 and the accommodating hole 1315 of the main body 131 of the capturing element 13. The circuit board 40 is mounted on the housing 20 with the switch 30 aligning with and accommodated within the resisting groove 1313 of the capturing element 13.

Figure 6:
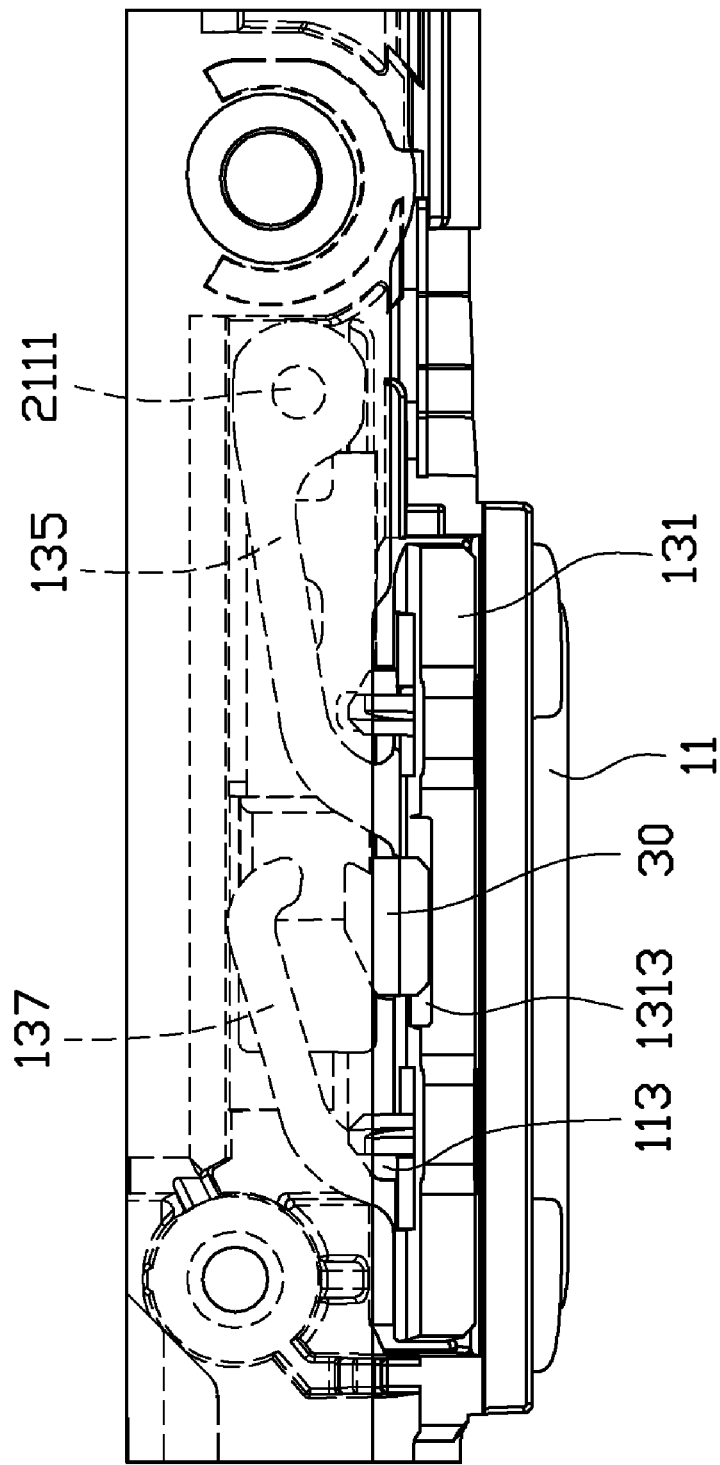
FIG. 6 is a top view of the portable electronic device shown in FIG. 5.

Referring to FIGS. 4-6, in use, when pressing the key button 11, the capturing element 13 is pushed by the key button 11 against the switch 30. The switch 30 is triggered to generate an electric controlling signal to the circuit board 40. Meanwhile, the first elastic arm 135 and the second elastic arm 137 are deformed to resist against the inner resisting wall 215 of the housing 20. When the key button 11 is released, the key button 11 automatically returns to its original position by the elastic force generated by capturing element 13.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A key button mechanism, comprising:
a key button comprising a key body and two spaced-apart latching hooks protruding from the same surface of the key body; and
a capturing element comprising a main body having two spaced-apart assembling holes defined therethrough, each assembling hole corresponding to one of the two latching hooks of the key button, each latching hook of the key button passing through one of the two assembling holes of the capturing element and detachably latching to the capturing element;
wherein the key button further includes a stopping post protruding from the key body and located between the two latching hooks; the capturing element further includes an accommodating hole defined through the main body and configured to receive the corresponding stopping post therein; and
wherein the capturing element further includes a block protruding from the main body adjacent to the accommodating hole; an elastic arm protruding from the main body, with a distal end of the elastic arm positioned above the block.

2. The key button mechanism as claimed in claim 1, wherein the capturing element further includes a resisting groove recessed from the main body thereof and positioned between the two assembling holes.

3. The key button mechanism as claimed in claim 1, wherein the capturing element further includes two spaced-apart elastic arms protruding from the main body, one elastic arm has a distal fixing end, the other elastic arm includes a stopping portion formed at the distal end thereof and located in front of the stopping portion.

4. The key button mechanism as claimed in claim 3, wherein the fixing end includes a fixing hole defined therethrough.

5. A portable electronic device, comprising:
a housing; and
a key button mechanism assembled to the housing, comprising:
a key button comprising a key body and two spaced-apart latching hooks protruding from the same surface of the key body; and
a capturing element comprising a main body having two spaced-apart assembling holes defined therethrough, each assembling hole corresponding to one of the two latching hooks of the key button, each latching hook of the key button passing through one of the two assembling holes of the capturing element and detachably latching to the capturing element
wherein the housing defines an assembling groove adjacent to one side portion thereof, thereby forming a base wall, an outer assembling wall and an inner resisting wall opposite to the outer assembling wall; the key button mechanism is accommodated within the assembling groove of the housing; and
wherein the capturing element further includes a first elastic arm protruding from the main body, the first elastic arm has a distal fixing end and a fixing hole defined through the distal fixing end; the housing includes a fixing post protruding from the base wall corresponding to the fixing hole of the first elastic arm, the fixing post passes through the fixing hole of the first elastic arm and elastically resists against the resisting wall of the assembling groove.

6. The portable electronic device as claimed in claim 5, wherein the outer assembling wall includes a key accommodating groove recessed from an outer surface thereof for receiving the key button therein.

7. The portable electronic device as claimed in claim 6, wherein the inner surface of the outer assembling wall defines a retaining slot therein communicating with the key accommodating groove; the dimension and shape of the retaining slot is slightly bigger than the accommodating groove; the main body of the capturing element is assembled within the retaining slot.

8. The portable electronic device as claimed in claim 5, wherein the key button further includes a stopping post protruding from the key body and located between the two latching hooks; the capturing element further includes an accommodating hole defined through the main body and configured to receive the corresponding stopping post therein.

9. The portable electronic device as claimed in claim 8, wherein the capturing element further includes a block protruding from the main body adjacent to the accommodating hole; an elastic arm protruding from the main body with a distal end of the elastic arm positioned in front of the block.

10. The portable electronic device as claimed in claim 5, wherein the capturing element further includes a block protruding from the main body adjacent to the accommodating hole and a second elastic arm protruding from the main body and spaced-apart to the first elastic arm; the second elastic arm includes a stopping portion formed at the distal end thereof and located in front of the block.

11. The portable electronic device as claimed in claim 10, wherein the capturing element further includes a resisting groove recessed from the main body thereof and positioned between the two assembling holes; the portable electronic device further includes a circuit board and a switch mounted on the circuit board, the circuit board is mounted on the housing with the switch aiming at and accommodated within the resisting groove of the capturing element.

12. A portable electronic device, comprising:
a housing;
a switch assembled in the housing; and
a key button mechanism assembled to the housing, comprising:
a key button comprising a key body, the key button used for triggers the switch; and
a connecting element received in the housing and located between the housing and the key button, the connecting element configured to locate the key button in the housing and elastically resist the housing so as to provide a force enabling the key button rebound from the switch after the key button triggers the switch;
wherein the key body has two latching hooks spacingly protruding from the key body; the connecting element comprises a main body having two spaced-apart assembling holes defined therethrough, each latching hook passes through and latches with one of the two assembly holes; and
wherein the connecting element further comprises a first elastic arm protruding from the main body and elastically resisting the housing.

13. The portable electronic device as claimed in claim 12, wherein the connecting comprises a second elastic arm protruding from the main body and spaced apart from the first arm, the second elastic arm elastically resisting the housing with a distal end thereof assembled to the housing.

* * * * *